Oct. 31, 1961  R. W. ERLBACHER  3,006,699
FORCED PRESSURE SEALED LUBRICATING
SYSTEM FOR CAST IRON BEARINGS
Filed June 9, 1958
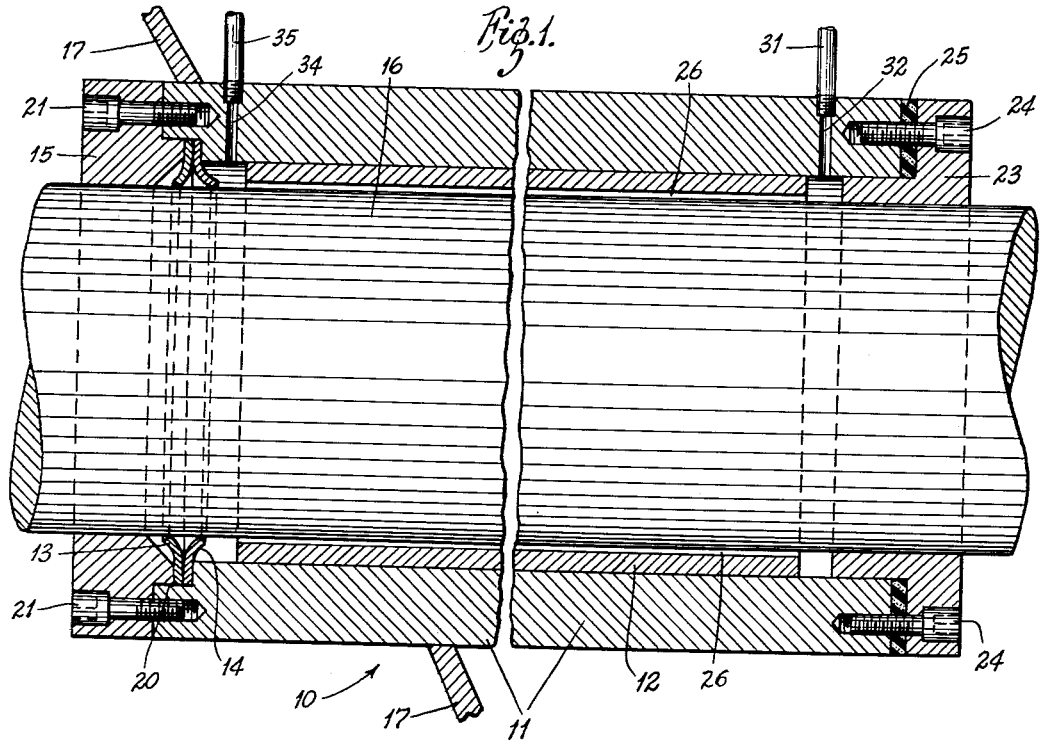
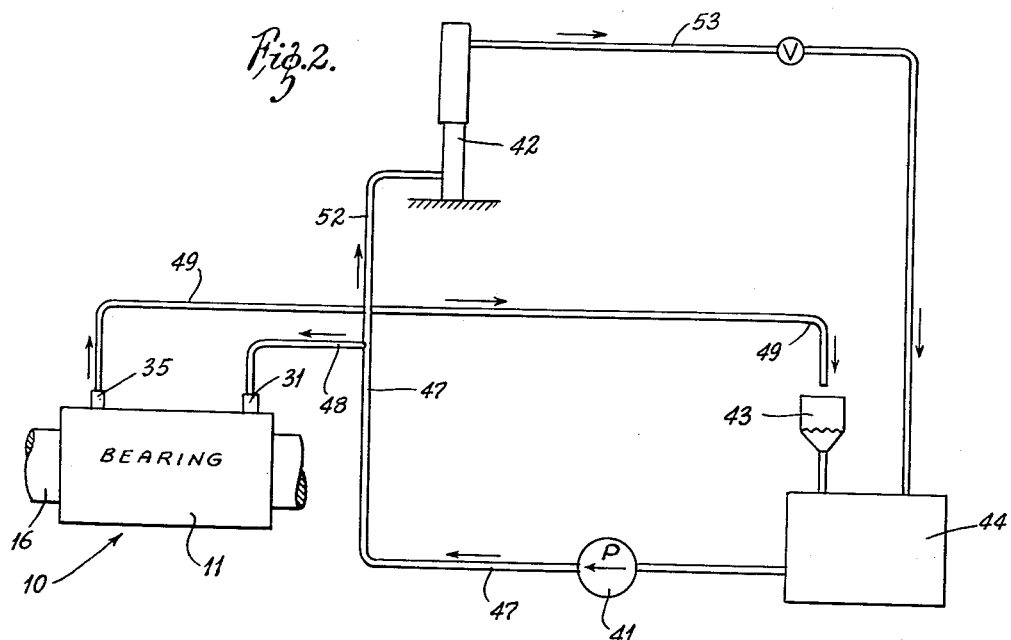
INVENTOR:
ROBERT W. ERLBACHER,
BY Kingsland, Rogers & Ezell
ATTORNEYS United States Patent Office 3,006,699
Patented Oct. 31, 1961

3,006,699
FORCED PRESSURE SEALED LUBRICATING
SYSTEM FOR CAST IRON BEARINGS
Robert W. Erlbacher, 920 N. Fountain,
Cape Girardeau, Mo.
Filed June 9, 1958, Ser. No. 740,723
2 Claims. (Cl. 308—36.1)

This invention relates to bearing systems, and in particular to a bearing system having means for lubricating the system under forced pressure with proper sealing therefor.

It has been a particular problem in the marine industry to provide for bearings for the massive propeller shafts which are commonly used. It will be understood that the bearings for these shafts are surrounded by water and leakage is an ever present problem. Whenever maintenance is required, the vessel, of course, must be taken out of service, which necessitates a lengthy lay-up and loss in revenue and a very substantial expenditure in time and money. It will be further understood that maintenance in service is quite difficult to provide while the vessel is afloat, since the bearings are normally in contact with water underneath the surface level.

There has been provided by this invention a forced pressure-sealed lubricating system for bearings made of cast iron in which the system has extremely long life and a very high efficiency in service. Essentially, this system provides cast iron bearing sleeves within which the steel propeller shaft is enclosed. A lubricant is supplied, which may be conventional marine oils, and the like, and a forced pressure system is employed to provide lubrication between the cast iron bearing and the steel shaft. As a consequence of the provision of the cast iron bearing, there is obtained a combined lubricant media consisting of graphite, formed by the wear of the cast iron, and the marine oil.

A further consequence of this invention is the provision of a forced lubricating system in which the lubricant is pumped through the bearing at a slow rate and in which a special seal is employed at the end of the bearing to protect the oil from leaking into the water through which the vessel travels and which surrounds the end of the bearing adjacent the propeller. This seal is of a special construction in order to prevent intermingling of the oil and water and to provide for a positive pressure of the marine oil within the system over the water at the exterior of the bearing. Further, maintenance, where required, can be easily made with these seals, which are formed of a resilient material, such as synthetic rubber or similar materials.

It is accordingly a primary object of the invention to provide a forced pressure-sealed lubricating system for cast iron bearings.

It is a further object of this invention to provide a bearing system for steel shafts in which a cast iron sleeve is employed with means for circulating lubricant under pressure through the bearing.

Still a further object of this invention is to provide a lubricating system for lubricating marine bearings by means of a forced pressure with a seal between the lubricant and the portion of the bearing exposed to the water through which the vessel passes.

Yet another object of this invention is to provide a forced pressure lubricating system for marine bearings in which an adjustable pressure means is employed to provide a pressure differential of the lubricant with respect to the water media to which the bearing is exposed.

Still another object of this invention is to provide a forced pressure cast iron bearing system for marine vessels in which the bearing has a removable cast iron sleeve and removable resilient seals for forming a barrier seal between the lubricant in the bearing and the water through which the vessel passes.

Yet another object of this invention is to provide a forced pressure-sealed lubricating system for marine vessels composed of standard materials of construction, which is rugged in construction, simple to repair and maintain, and relatively inexpensive in cost.

Further objects of this invention will appear in the detailed description to follow and will be further apparent to those skilled in the art.

For the purpose of illustration of this invention, there is shown in the accompanying drawings a preferred embodiment of the invention. It is to be understood that these drawings are, however, for the purpose of description only and that the invention is not limited thereto.

In the drawings:

FIGURE 1 is a view in vertical cross section through the bearing of this invention; and FIGURE 2 is a schematic diagram showing the forced pressure-sealed lubricating system employed with the bearing.

In the bearing of this invention, cast iron has been found to be particularly well adapted as the bearing material. Cast iron, as is well understood in the art, conventionally employs greater than 1.7 percent carbon and, although not being limited to the mechanism of the action of the cast iron bearing in this invention, it is believed that, upon wear, some of this higher percentage of carbon is worn off the bearing by the action of the steel shaft into free carbon in the form of graphite which aids in the lubrication between the moving parts.

A typical cast iron formulation which has been found to be desirable in this invention is as listed below:

| | Percent |
|---|---|
| Carbon | 3.05 |
| Silicon | 2.38 |
| Sulphur | 0.107 |
| Manganese | 0.50 |
| Phosphorus | 0.44 |
| Iron | Remainder |

The bearing employed in this invention is shown generally by the numeral 10 in FIGURE 1. As its main components, it includes a housing 11 of steel or other suitable material of construction, a cast iron bearing sleeve 12, seals 13 and 14, and a seal support block 15. A propeller shaft 16 is shown supported within the bearing with the forward end of the shaft being located at the right-hand portion of the drawing and the rear or aft portion of the shaft being located at the left-hand portion of the drawing. It will be understood that the bearing may be attached at various portions of the hull, which merely for the purpose of example is shown at 17, it being understood that this positional relationship can be altered.

As shown in FIGURE 1, the steel housing 11 is in the form of a hollow cylinder provided with a shoulder 20 at the rear. The two seals 13 and 14 are supported within this shoulder by drawing up the supporting block 15 against the tops of the seals by the use of bolts 21. The seals 13 and 14 are normally in the shape of flat, rim-like configurations and are made of a synthetic rubber material resistant to attack by oil and water. They have a diameter slightly smaller than the diameter of the shaft, so that when inserted upon the shaft, they assume the position shown in FIGURE 1 when the supporting block 15 is drawn up tight against them.

At the forward end of the bearing is a cast iron collar bearing element 23. This collar is attached to the forward end of the housing by bolts 24, and packing 25 is provided to prevent leakage of oil.

The cast iron collar 12, which may be made in a plurality of sections if so desired, is shown in FIGURE 1 disposed intermediately of the seal support 15 and the collar 23 and slightly spaced from each of these elements. A groove 26 is shown on the interior of the cast iron sleeve, which runs longitudinally along the axis of the sleeve to provide for passage of lubricating fluid. It will be understood that a plurality of grooves may be employed if desired.

In order to provide for passage of lubricating oil through the bearing, an inlet 31 is shown at the righthand portion of the drawing of FIGURE 1. This inlet communicates with a port 32 within the steel housing and fluid is passed therethrough to the space between the cast iron sleeve and the collar 23. The porting of oil from the bearing is provided at the rear portion of the bearing through a port 34 provided within the steel housing which communicates with the space between the seal supports 15 and the rear end of the cast iron sleeve 12. The other end of the port 34 communicates with an outlet conduit 35.

The bearing system and forced lubrication means are best shown in the schematic diagram of FIGURE 2. The principal components of this system comprise the bearing 10, a pump 41, a standpipe 42, a screen 43, and a reservoir tank 44. The standpipe 42 is adjustable so that different oil pressures may be employed by varying the outlet conduit to be described. The screen 43 is employed to separate any foreign material that may be carried into the lubricating system.

In the system shown in FIGURE 2, the pump 41 provides fluid to the bearing through conduits 47 and 48. Oil is recycled from the bearing by means of a conduit 49 which passes the fluid to the screen 43 and from there to the reservoir 44 from which it returns to the pump by means of a conduit 51. The standpipe 42 is connected into the system by means of a conduit 52 connecting with the outlet of the pump through the conduit 47. An outlet conduit 53 returns the oil from the standpipe to the reservoir 44, it being understood that the standpipe may be adjustable itself or the connection of the conduit 53 with the standpipe 42 may be adjusted vertically (not shown), to provide different pressures within the lubricating system, as is well understood in the art for such a standpipe control.

*Use*

The bearing shown in FIGURE 1 is adapted to be assembled or maintained in very simple fashion. As described previously, the housing 11 may be connected to any stationary support within the vessel, as will be well understood.

The cast iron bearing sleeve 12 may be either pressfitted into the housing 11 or supported in stationary relationship with it by the use of radial bolts attaching the two, as will be well understood. The collar 23 may be simply withdrawn at any time by loosening the bolts 24 and withdrawing the same. Likewise, the seal support 15 may be very simply withdrawn by loosening the bolts 21. Once the seal support and the collar 23 have been withdrawn, the shaft and sleeve may be very simply withdrawn from the bearing.

For maintenance of the seals 13 and 14, it will be seen that the withdrawal of the seal support 15 can be very expeditiously accomplished and new seals can be inserted when this is required. Likewise, should new cast iron sleeves be required, this can be simply accomplished by withdrawing either the seal support 15 or the collar 23 and inserting new sleeves. Thus, a very simple assembly for maintenance and repair is provided for the bearing of this invention.

In the bearing system of FIGURE 2, it will be seen that the conduit 48 can be very simply connected to the inlet conduit 31 shown in FIGURE 1, and, similarly, the outlet conduit of FIGURE 2 can be connected to the outlet conduit 35 of FIGURE 1. When so connected in the system, the operation of the pump is commenced and the standpipe is adjusted by moving the conduit 53 to the proper vertical relationship to establish the correct head of the oil flowing through the system. It will be understood that this will be readily accomplished by observing the flow of oil through the system as effected by oil dripping from the conduit 49 into the screen 43 and from there into the reservoir 44.

For desirable operation, the pressure differential of the oil passing through the system should be slightly in excess of the head of water underneath the surface level of the water in the region of the seals 13 and 14 for obvious reasons. Thus, should any leakage occur, oil will flow into the water rather than having the water flow into the oil system. However, should any such mishap occur through faulty operation of the standpipe and establishment of the proper pressure differential in the system, it will be seen that any water in the oil system can be observed when it drips from the conduit 49 into the screen 43 and into the reservoir 44.

Accordingly, it will be seen that there has been provided a forced pressure system for lubricating the cast iron bearing which, in this invention, has made possible a very simple and efficient sealed lubrication system. The system is easy to adjust, and with the bearing of this invention, there has been provided a fully adaptable, easy to install, maintain and service mechanism which stands up well in service, and is relatively inexpensive in cost.

Various changes and modifications may be made within this invention as will be apparent and obvious to those skilled in the art. Such changes and modifications are within the scope and teaching of this invention as defied by the claims appended hereto.

What is claimed is:

1. A bearing for massive rotary shafts comprising a housing, a cast iron sleeve supported within said housing and receiving said shaft, a collar sealing one end of the housing and a sealing support means for sealing the second end of the housing comprising a sealing block and a pair of annular flexible seals fitting around the shaft and secured to said housing, said seals having an opening slightly less than the diameter of the shaft and having their inner peripheries in divergent positional relationship and said sealing block having vertical wall means removably secured to a vertical end wall of the housing with the peripheral portions of said seal fastened in vertical relationship between the block and the housing, and means for forcing oil through said bearing at a controlled greater pressure than the pressure to which the exterior of the bearing is exposed, said means including a pump and an adjustable standpipe for establishing a controllable oil pressure on the oil passing through the bearing, and a return line from the bearing leading into a reservoir connecting with said pump, said return line terminating above the reservoir whereby visual inspection may be made of the oil passing into the reservoir.

2. A marine bearing for propeller shafts comprising a housing having its rear end exposed to the water at a depth below the surface, a cast iron sleeve supported within said housing and receiving said shaft, a cast iron collar sealing the forward end of the housing and a rear end sealing means for sealing the rear of the housing comprising a sealing block and a pair of annular flexible seals fitting around the shaft in divergent relationship and secured to said housing, and means for forcing oil through said bearing at a controlled greater pressure than the water pressure head to which the rear of the housing is exposed, said means including a pump and an adjustable standpipe for establishing a controllable oil pressure on the oil passing through the bearing which is greater than the water pressure at the rear of the housing.

References Cited in the file of this patent

UNITED STATES PATENTS

| | | |
|---|---|---|
| 792,929 | Roberts | June 20, 1905 |
| 824,187 | Lowe | June 26, 1906 |
| 1,323,474 | Hodgkinson | Dec. 2, 1919 |
| 2,517,208 | Hunt | Aug. 1, 1950 |
| 2,676,040 | Dalton | Apr. 20, 1954 |
| 2,827,342 | Roach | Mar. 18, 1958 |